United States Patent
Xie et al.

(10) Patent No.: US 11,176,348 B2
(45) Date of Patent: Nov. 16, 2021

(54) OPTICAL FINGERPRINT APPARATUS AND ELECTRONIC DEVICE

(71) Applicant: SHENZHEN GOODIX TECHNOLOGY CO., LTD., Shenzhen (CN)

(72) Inventors: Lianghui Xie, Shenzhen (CN); Weiwen Chen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/033,761

(22) Filed: Sep. 26, 2020

(65) Prior Publication Data
US 2021/0042494 A1  Feb. 11, 2021

Related U.S. Application Data

(63) Continuation of application No. PCT/CN2020/071511, filed on Jan. 10, 2020.

(30) Foreign Application Priority Data

Aug. 6, 2019 (WO) ................ PCT/CN2019/099487
Aug. 29, 2019 (WO) ................ PCT/CN2019/103202
Oct. 23, 2019 (WO) ................ PCT/CN2019/112778

(51) Int. Cl.
  *G06K 9/00* (2006.01)
(52) U.S. Cl.
  CPC ....... *G06K 9/0004* (2013.01); *G06K 9/00107* (2013.01)
(58) Field of Classification Search
  CPC .................................................. G06K 9/0004
  See application file for complete search history.

(56) References Cited

U.S. PATENT DOCUMENTS 7,489,391 B2  2/2009 Engheta et al.
8,125,579 B2  2/2012 Khan et al.
(Continued)

FOREIGN PATENT DOCUMENTS

CN  102436577 A  5/2012
CN  103487954 A  1/2014
(Continued)

OTHER PUBLICATIONS

Gil Abramovich et al. "A spoof detection method for contactless fingerprint collection utilizing spectrum and polarization diversity", Proceedings of the SPIE—The International Society for Optical Engineering, Dec. 31, 2010, 11 pages.
(Continued)

*Primary Examiner* — Joseph R Haley
(74) *Attorney, Agent, or Firm* — Scully Scott Murphy & Presser

(57) ABSTRACT

Provided are an optical fingerprint apparatus and an electronic device, the optical fingerprint apparatus includes: a light directing layer configured to direct a light signal returned from a finger above the display screen to an optical sensing array along at least two directions, where the at least two directions are oblique with respect to the display screen, and projections of the at least two directions on the display screen are at different angles with a polarization direction of the display screen; and the optical sensing array including a plurality of sensing unit groups, where light signals in the at least two directions are used to obtain a fingerprint image of the finger, and a difference between the light signals in the at least two directions received by the sensing unit group is used to determine whether the finger is a real finger.

20 Claims, 8 Drawing Sheets

(56) References Cited

U.S. PATENT DOCUMENTS

| | | |
|---|---|---|
| 2003/0183019 A1 | 10/2003 | Chae |
| 2008/0069408 A1 | 3/2008 | Cervantes |
| 2009/0161040 A1 | 6/2009 | Khan et al. |
| 2010/0135540 A1 | 6/2010 | Cervantes |
| 2014/0044323 A1 | 2/2014 | Abramovich et al. |
| 2016/0328595 A1 | 11/2016 | Sun et al. |
| 2017/0300738 A1* | 10/2017 | Li ................ G06K 9/00107 |
| 2018/0165823 A1 | 6/2018 | Ludwig |
| 2018/0211079 A1 | 7/2018 | Liu et al. |
| 2019/0026523 A1* | 1/2019 | Shen ................ G02B 6/4203 |
| 2019/0034690 A1* | 1/2019 | Jung ................ G06K 9/0008 |
| 2019/0120763 A1 | 4/2019 | Wu et al. |
| 2019/0188875 A1 | 6/2019 | Ludwig |
| 2021/0081639 A1* | 3/2021 | Sun ................ G06K 9/0004 |

FOREIGN PATENT DOCUMENTS

| | | |
|---|---|---|
| CN | 103902974 A | 7/2014 |
| CN | 105830121 A | 8/2016 |
| CN | 106127134 A | 11/2016 |
| CN | 106295527 A | 1/2017 |
| CN | 106355136 A | 1/2017 |
| CN | 106773229 A | 5/2017 |
| CN | 107004114 A | 8/2017 |
| CN | 207571759 U | 7/2018 |
| CN | 208141405 U | 11/2018 |
| CN | 109196525 A | 1/2019 |
| CN | 109271834 A | 1/2019 |
| CN | 109313706 A | 2/2019 |
| CN | 109325400 A | 2/2019 |
| CN | 109478083 A | 3/2019 |
| CN | 109491169 A | 3/2019 |
| CN | 109496313 A | 3/2019 |
| CN | 109784264 A | 5/2019 |
| CN | 109791599 A | 5/2019 |
| CN | 109858417 A | 6/2019 |
| CN | 109863506 A | 6/2019 |
| CN | 109886118 A | 6/2019 |
| CN | 109886177 A | 6/2019 |
| CN | 110084090 A | 8/2019 |
| CN | 210605741 U | 5/2020 |
| EP | 2918217 A4 | 2/2016 |
| JP | 2007244772 A | 9/2007 |
| KR | 101807289 B1 | 12/2017 |
| KR | 101874865 B1 | 7/2018 |
| TW | M572986 U | 1/2019 |

OTHER PUBLICATIONS

Yu-sheng Han et al. "Research on Polarization Imaging Detection Method of Latent Fingerprints Based on Active Polarized Light", Infrared, 2014, 035(008):5-9, Aug. 31, 2014, 5 pages.

Jin-feng Yang et al. "Polarized imaging system for multimodal finger-feature acquisition", Journal of Civil Aviation University of China, 2015, 33(006):28-31, Dec. 31, 2015, 5 pages.

Lei Zhang et al. "Active polarization imaging method for latent fingerprint detection", Optical and Quantum Electronics (2018), 50(9). doi: 10.1007/sl1082-018-1616-8, Sep. 29, 2018, 12 pages.

Qiangqiang, T., "Research of the active imaging system based on the polarization retrieve", Doctoral dissertation, Hefei University of Technology, Sep. 15, 2018, pp. 1-81.

* cited by examiner

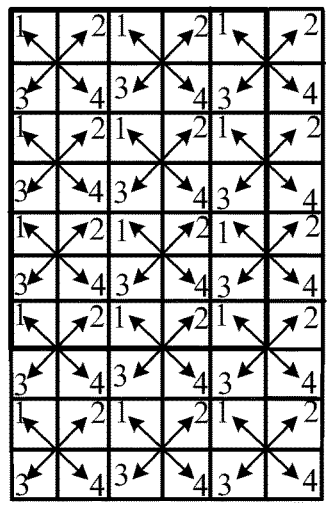
FIG. 5
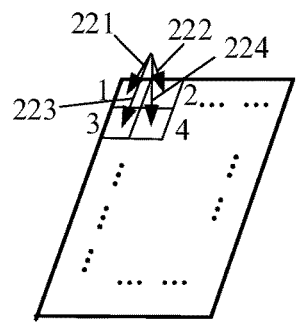
FIG. 6
| 2 | 2 | 1 | 1 | 2 | 2 | 1 | 1 |
|---|---|---|---|---|---|---|---|
| 2 | 2 | 1 | 1 | 2 | 2 | 1 | 1 |
| 3 | 3 | 4 | 4 | 3 | 3 | 4 | 4 |
| 3 | 3 | 4 | 4 | 3 | 3 | 4 | 4 |
| 2 | 2 | 1 | 1 | 2 | 2 | 1 | 1 |
| 2 | 2 | 1 | 1 | 2 | 2 | 1 | 1 |
| 3 | 3 | 4 | 4 | 3 | 3 | 4 | 4 |
| 3 | 3 | 4 | 4 | 3 | 3 | 4 | 4 |
FIG. 7

OPTICAL FINGERPRINT APPARATUS AND ELECTRONIC DEVICE

CROSS-REFERENCE TO RELATED APPLICATIONS

This application is a continuation of International Application No. PCT/CN2020/071511, filed on Jan. 10, 2020, which claims priority to PCT Application No. PCT/CN2019/099487, filed on Aug. 6, 2019, PCT Application No. PCT/CN2019/112778, filed on Oct. 23, 2019, and PCT Application No. PCT/CN2019/103202, filed on Aug. 29, 2019. All of the aforementioned patent applications are hereby incorporated by reference in their entireties.

TECHNICAL FIELD

The present application relates to the technical field of optical fingerprints, and more particularly, to an optical fingerprint apparatus and an electronic device.

BACKGROUND

Under-screen fingerprint identification technology implements under-screen fingerprint identification by capturing a light signal formed by reflection or transmittance of light by a finger, where the light signal carries fingerprint information of the finger. However, forged planar fake fingerprint data such as user's fingerprint photos (for example, printed or electronic) can deceive a fingerprint identification system, making the security of a fingerprint identification application poor. Therefore, how to identify real and fake fingerprints to improve security of fingerprint identification is an urgent problem to be solved.

SUMMARY

The present application provides an optical fingerprint apparatus and an electronic device, which can improve security of optical fingerprint identification.

In a first aspect, provided is an optical fingerprint apparatus, where the optical fingerprint apparatus is configured to be disposed under a display screen of an electronic device and includes:

a light directing layer configured to direct a light signal returned from a finger above the display screen to an optical sensing array along at least two directions, where the at least two directions are oblique with respect to the display screen, and projections of the at least two directions on the display screen are at different angles with a polarization direction of the display screen; and the optical sensing array including a plurality of sensing unit groups, each sensing unit group including at least two optical sensing units, and each optical sensing unit of the at least two optical sensing units being configured to receive a light signal in one direction of the at least two directions, where light signals in the at least two directions are used to obtain a fingerprint image of the finger, and a difference between the light signals in the at least two directions received by the sensing unit group is used to determine whether the finger is a real finger.

In some possible implementation manners, the at least two directions include a first direction and a second direction, a projection of the first direction on the display screen is parallel to the polarization direction of the display screen, and a projection of the second direction on the display screen is perpendicular to the polarization direction of the display screen.

In some possible implementation manners, the at least two directions include a first direction and a second direction, and projections of the first direction and the second direction on the optical sensing array are respectively parallel to two diagonal lines of an optical sensing unit.

In some possible implementation manners, the at least two directions include a first direction, a second direction, a third direction, and a fourth direction, and projections of the first direction and the fourth direction on the display screen are parallel to the polarization direction of the display screen, and projections of the second direction and the third direction on the display screen are perpendicular to the polarization direction of the display screen; and the sensing unit group includes four optical sensing units in a 2×2 array that are respectively configured to receive light signals directed by the light directing layer along the first direction, the second direction, the third direction and the fourth direction, where a difference between light signals in the first direction and the fourth direction received by the sensing unit group and light signals in the second direction and the third direction received by the sensing unit group is used to determine whether the finger is a real finger.

In some possible implementation manners, optical sensing units for receiving the light signals in the first direction and the fourth direction in the sensing unit group are located on a diagonal line of the 2×2 array, and optical sensing units for receiving the light signals in the second direction and the third direction in the sensing unit group are located on another diagonal line of the 2×2 array.

In some possible implementation manners, the light signals in the first direction and the fourth direction received by the sensing unit group are light signals dominated by a P wave, and the light signals in the second direction and the third direction received by the sensing unit group are light signals dominated by an S wave.

In some possible implementation manners, the light directing layer includes:

a micro-lens array including a plurality of micro-lenses for converging the light signals in the at least two directions; and at least one light shielding layer disposed below the micro-lens array, where each light shielding layer includes multiple groups of holes corresponding to the plurality of micro-lenses, and the plurality of micro-lenses are configured to direct the light signals in the at least two directions to the optical sensing array through corresponding multiple groups of holes in the at least one light shielding layer.

In some possible implementation manners, each micro-lens of the plurality of micro-lenses corresponds to one sensing unit group of the plurality of sensing unit groups, and the micro-lens is disposed above a corresponding sensing unit group, where a connecting line direction of a group of holes in respective light shielding layers corresponding to a same micro-lens is used to form the at least two directions, and the micro-lens is configured to direct the light signals in the at least two directions to the at least two optical sensing units in the corresponding sensing unit group through a corresponding group of holes in the at least one light shielding layer.

In some possible implementation manners, each micro-lens of the plurality of micro-lenses corresponds to one optical sensing unit, and the micro-lens is disposed obliquely above a corresponding sensing unit, where a connecting line direction of a group of holes in respective light shielding layers corresponding to a same micro-lens is used to form the one direction of the at least two directions, and the micro-lens is configured to direct the light signal in the one direction to the corresponding optical sensing unit through a corresponding group of holes in the at least one light shielding layer.

In some possible implementation manners, the at least one light shielding layer is a plurality of light shielding layers, a bottom light shielding layer of the plurality of light shielding layers is provided with a hole corresponding to each optical sensing unit in the sensing unit group respectively, and a top light shielding layer of the plurality of light shielding layers is provided with a hole corresponding to each optical sensing unit in the sensing unit group respectively, or is provided with one hole corresponding to the sensing unit group, so that the plurality of micro-lenses converge the light signals in the at least two directions to each optical sensing unit in the optical sensing array through corresponding holes respectively.

In some possible implementation manners, apertures of holes in the plurality of light shielding layers corresponding to a same optical sensing unit sequentially decrease from top to bottom.

In some possible implementation manners, the optical fingerprint apparatus further includes a transparent medium layer, and the transparent medium layer is configured to connect the micro-lens array, the at least one light shielding layer and the optical sensing array.

In some possible implementation manners, the light directing layer includes:

a plurality of light directing channels disposed obliquely with respect to the display screen, where oblique directions of the plurality of light directing channels with respect to the display screen are used to form the at least two directions, and the plurality of light directing channels are configured to direct the light signal returned from the finger above the display screen to the at least two optical sensing units in the each sensing unit group along the at least two directions.

In some possible implementation manners, each light directing channel of the plurality of light directing channels corresponds to at least one optical sensing unit, and the light directing channel is configured to direct the light signal returned from the finger above the display screen to a corresponding optical sensing unit along the one direction of the at least two directions.

In some possible implementation manners, the light directing layer includes:

a plurality of optical fibers disposed obliquely with respect to the display screen, where oblique directions of the plurality of optical fibers with respect to the display screen are used to form the at least two directions, and the light signals in the at least two directions are transmitted to corresponding optical sensing units in the plurality of optical fibers based on total reflection.

In some possible implementation manners, each optical fiber of the plurality of optical fibers corresponds to at least one optical sensing unit, and the optical fiber is configured to direct the light signal returned from the finger above the display screen to a corresponding optical sensing unit along the one direction of the at least two directions.

In some possible implementation manners, a difference in at least one of a signal amount, a modulation transfer function (MTF), spatial noise, or a contrast of the light signals in the at least two directions is used to determine whether the finger is a real finger.

In some possible implementation manners, the at least two directions include a first direction and a second direction, a projection of the first direction on the display screen is parallel to the polarization direction of the display screen, and a projection of the second direction on the display screen is perpendicular to the polarization direction of the display screen; and if a difference value between a signal amount of a light signal in the first direction and a signal amount of a light signal in the second direction falls within a first range, it is determined that the finger is a real finger; or if a difference value between a signal amount of a light signal in the first direction and a signal amount of a light signal in the second direction does not fall within a first range, it is determined that the finger is a fake finger.

In some possible implementation manners, the at least two optical sensing units in the each sensing unit group are disposed adjacent to each other.

In some possible implementation manners, the optical fingerprint apparatus further includes a filter layer disposed in a light path between the display screen and the optical sensing array, and configured to filter out a light signal of a non-target wavelength band and transmit a light signal of a target wavelength band.

In a second aspect, provided is an electronic device, including: a display screen and the optical fingerprint apparatus in the first aspect or any possible implementation manner of the first aspect, where the optical fingerprint apparatus is disposed under the display screen.

In some possible implementation manners, the display screen is an organic light-emitting diode (OLED) display screen, and the optical fingerprint apparatus employs some of display units of the OLED display screen as an excitation light source for optical fingerprint detection.

Therefore, in the optical fingerprint apparatus of the embodiment of the present application, at least two optical sensing units in each sensing unit group in the optical sensing array can receive oblique light signals in at least two directions, and projections of the oblique light signals in at least two directions on the display screen are at different angles with the polarization direction of the display screen. In this way, for a real finger, it is a 3D model, and the light signals in the at least two directions captured by the sensing unit group exhibit different polarization characteristics, while for a fake finger, it is a 2D model, diffuse reflection approximately occurs, and thus polarization characteristics of the light signals in the at least two directions captured by the sensing unit group are similar or the same. Therefore, based on a difference between light signals in different directions captured by the sensing unit group, a real or fake finger can be determined.

BRIEF DESCRIPTION OF THE DRAWINGS

FIG. 5 is a schematic diagram of an arrangement manner of a sensing unit group in an optical fingerprint apparatus.

FIG. 6 is a schematic diagram of the optical fingerprint apparatus shown in FIG. 5 receiving light signals in different directions.

FIG. 7 is a schematic diagram of another arrangement manner of a sensing unit group in an optical fingerprint apparatus.

DESCRIPTION OF EMBODIMENTS

Technical solutions of the present application will be described hereinafter in conjunction with the accompanying drawings.

It should be understood that embodiments of the present application may be applied to a fingerprint system, including but not limited to an optical, ultrasonic or other fingerprint detection system and a medical diagnostic product based on optical, ultrasonic or other fingerprint imaging. The embodiments of the present application are only described by an example of an optical fingerprint system, which should not constitute any limitation to the embodiments of the present application, and the embodiments of the present application are also applicable to other systems using an optical, ultrasonic or other imaging technology or the like.

As a common application scenario, the optical fingerprint system provided in an embodiment of the present application may be applied to a smart phone, a tablet computer, and other mobile terminals having a display screen or other electronic devices. More specifically, in the foregoing electronic devices, an optical fingerprint module may be disposed in a partial region or an entire region under a display screen, thereby forming an under-display (Under-screen) optical fingerprint system. Alternatively, the optical fingerprint module may be partially or entirely integrated into the interior of the display screen of the electronic device to form an in-display (In-screen) optical fingerprint system.

Under-screen optical fingerprint detection technology uses light returned from a top surface of a display component of a device for fingerprint sensing and other sensing operations. The returned light carries information of an object such as a finger in contact with the top surface, and optical fingerprint detection of a particular optical sensor module located under a display screen is implemented by capturing and detecting the light returned from the finger. An optical sensor module can be designed to achieve a desired optical imaging by properly configuring optical elements for capturing and detecting the returned light.

Figure 1A:
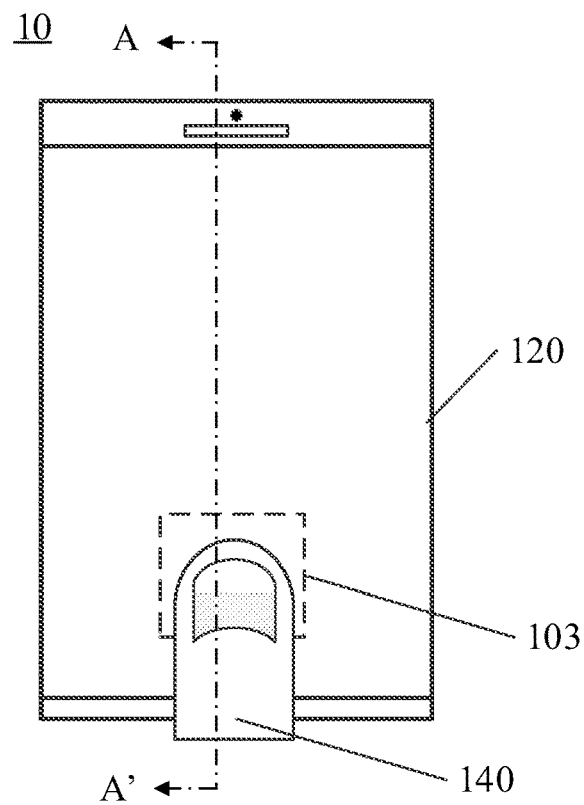
FIGS. 1A and 2A are schematic diagrams of an electronic device to which the present application is applicable.
Figure 1B:
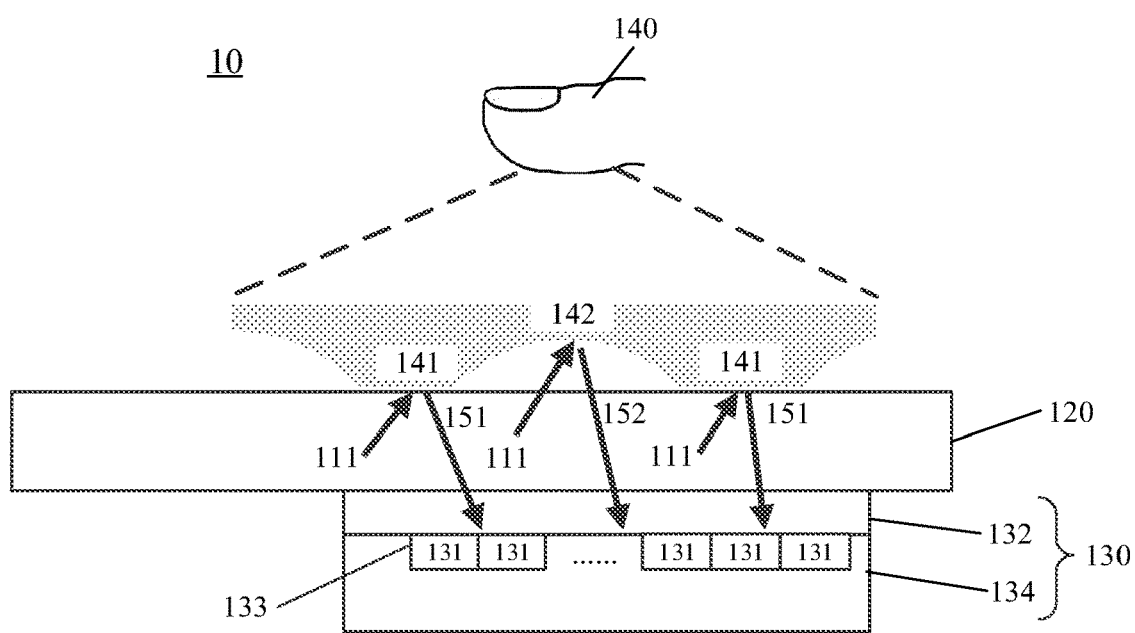
FIGS. 1B and 2B are schematic cross-sectional diagrams of the electronic device shown in FIGS. 1A and 2A taken along an A-A' direction, respectively.
Figure 2A:
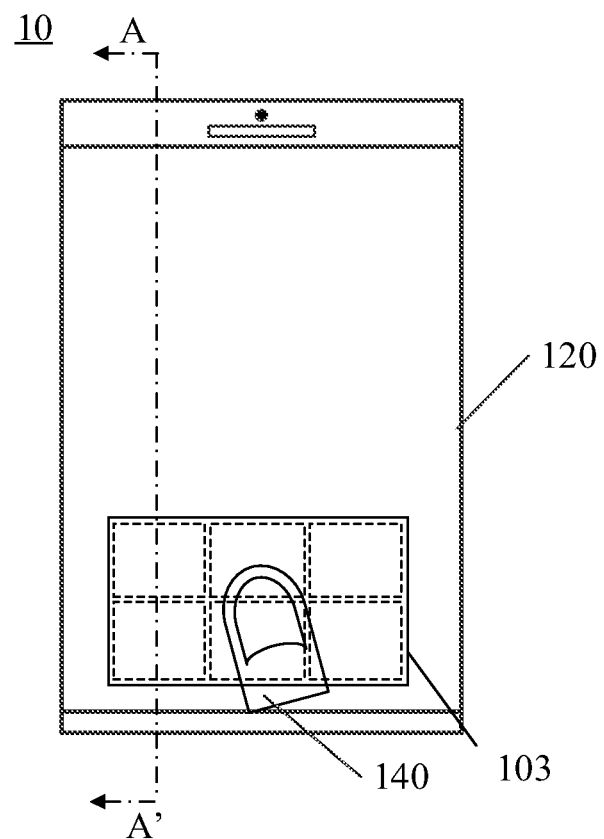
Figure 2B:
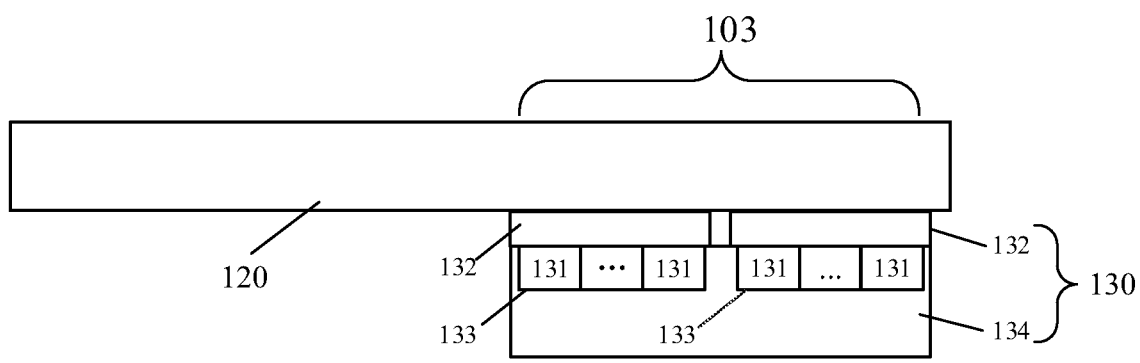

FIGS. 1A and 2A show schematic diagrams of an electronic device to which an embodiment of the present application is applicable. FIGS. 1A and 2A are schematic oriented diagrams of an electronic device 10; and FIGS. 1B and 2B are partial schematic cross-sectional diagrams of the electronic device 10 shown in FIGS. 1A and 2A taken along an A-A' direction, respectively.

The electronic device 10 includes a display screen 120 and an optical fingerprint module 130. The optical fingerprint module 130 is disposed in a partial region under the display screen 120. The optical fingerprint module 130 includes an optical fingerprint sensor that includes a sensing array 133 having a plurality of optical sensing units 131 (which may also be referred to as pixels, photosensitive pixels, pixel units, etc.). A region where the sensing array 133 is located or a sensing region of the sensing array 133 is a fingerprint detection region 103 of the optical fingerprint module 130. As shown in FIG. 1, the fingerprint detection region 103 is located within a display region of the display screen 120. In an alternative embodiment, the optical fingerprint module 130 may also be disposed at other positions, such as a side of the display screen 120 or an edge non-light transmitting region of the electronic device 10, and a light signal from at least part of the display region of the display screen 120 is directed to the optical fingerprint module 130 through a light path design, such that the fingerprint detection region 103 is actually located in the display region of the display screen 120.

It should be understood that an area of the fingerprint detection region 103 may be different from an area of the sensing array 133 of the optical fingerprint module 130. For example, the area of the fingerprint detection region 103 of the optical fingerprint module 130 is larger than the area of the sensing array 133 of the optical fingerprint module 130 through a light path design such as lens imaging, reflective folding, or light convergence or reflection, etc. In other alternative implementation manners, if a light path is directed in a manner of light collimation for example, the area of the fingerprint detection region 103 of the optical fingerprint module 130 may also be designed to be substantially identical with the area of the sensing array 133 of the optical fingerprint module 130.

Therefore, when a user needs to unlock the electronic device 10 or perform other fingerprint verification, a fingerprint input can be implemented merely by pressing a finger on the fingerprint detection region 103 in the display screen 120. Since fingerprint detection may be implemented in the screen, there is no need to exclusively reserve space for a front surface of the electronic device 10 adopting the foregoing structure to set a fingerprint button (such as a Home button), so that a full screen solution may be adopted; that is, the display region of the display screen 120 may be substantially extended to an entire front surface of the electronic device 10.

As an optional implementation manner, as shown in FIG. 1B, the optical fingerprint module 130 includes a light detecting portion 134 and an optical component 132. The light detecting portion 134 includes the sensing array 133 and a readout circuit and other auxiliary circuits electrically connected to the sensing array 133, and may be fabricated on a die by a semiconductor process, to form an optical fingerprint sensor (or referred to as an optical fingerprint chip, a sensor, a sensor chip, a chip, etc.). The sensing array 133 is specifically a photodetector array including a plurality of photo detectors distributed in an array, and the photo detectors may serve as the optical sensing units as described above. The optical component 132 may be disposed above the sensing array 133 of the light detecting portion 134, and may specifically include a filter layer, a light directing layer or a light path directing structure, and other optical elements. The filter layer may be used to filter ambient light passing through a finger, and the light directing layer is mainly used to direct reflected light reflected from a finger surface to the sensing array 133 for fingerprint detection.

In specific implementation, the optical component 132 and the light detecting portion 134 may be encapsulated in the same optical fingerprint member. For example, the optical component 132 and the light detecting portion 134 may be encapsulated in the same optical fingerprint chip, or the optical component 132 may be disposed outside a chip where the light detecting portion 134 is located, for example, the optical component 132 is attached above the chip, or some of elements of the optical component 132 are integrated into the chip.

There are various implementation solutions for the light directing layer of the optical component 132. For example, the light directing layer may be specifically a collimator layer fabricated on a semiconductor silicon wafer and having a plurality of collimating units or an array of micro-holes, and the collimating unit may be specifically a hole. Light in the reflected light reflected from the finger that is vertically incident on the collimating unit may pass through the collimating unit and be received by the optical sensing unit below the collimating unit, and light with an excessively large angle of incidence is attenuated in the collimating unit through multiple reflection. Therefore, each optical sensing unit may substantially only receive the reflected light reflected from a fingerprint pattern right above the optical sensing unit, and thus the sensing array 133 may detect a fingerprint image of the finger.

In another implementation manner, the light directing layer may also be an optical lens layer having one or more lens units, for example, a lens group composed of one or more aspheric lenses, for converging reflected light reflected from a finger to the sensing array 133 of the light detecting portion 134 below the optical lens layer, so that the sensing array 133 may perform imaging based on the reflected light so as to obtain a fingerprint image of the finger. Optionally, the optical lens layer may be provided with a pinhole in a light path of the lens unit(s), and the pinhole may cooperate with the optical lens layer to expand a field of view of the optical fingerprint module 130, to improve a fingerprint imaging effect of the optical fingerprint module 130.

In other implementation manners, the light directing layer may also specifically adopt a micro-lens layer, the micro-lens layer has a micro-lens array constituted by a plurality of micro-lenses, and may be formed above the sensing array 133 of the light detecting portion 134 by a semiconductor growth process or other processes, and each micro-lens may correspond to one of the sensing units in the sensing array 133 respectively. Other optical film layers such as a dielectric layer or a passivation layer may be formed between the micro-lens layer and the sensing unit. Further, a light shielding layer (or referred to as a light blocking layer, a light resisting layer, etc.) having a micro-hole may also be formed between the micro-lens layer and the sensing unit, where the micro-hole is formed between the corresponding micro-lens and the sensing unit, and the light shielding layer may shield optical interference between adjacent micro-lenses and the sensing units, such that light corresponding to the sensing unit is converged to the interior of the micro-hole through the micro-lens and transmitted to the sensing unit via the micro-hole for optical fingerprint imaging.

It should be understood that several implementation solutions of the above-described light directing layer may be used alone or in combination. For example, a micro-lens layer may be further disposed above or below the collimator layer or the optical lens layer. Certainly, when the collimator layer or the optical lens layer is used in combination with the micro-lens layer, the specific laminated structure or light path may require to be adjusted according to actual needs.

As an optional implementation manner, the display screen 120 may adopt a display screen with a self-emitting display unit, for example, an organic light-emitting diode (OLED) display screen or a micro light-emitting diode (Micro-LED) display screen. As an example, in a case where an OLED display screen is adopted, the optical fingerprint module 130 may use a display unit (that is, an OLED light source) of the OLED display screen 120 located at the fingerprint detection region 103 as an excitation light source for optical fingerprint detection. When a finger 140 is pressed against the fingerprint detection region 103, the display screen 120 emits a beam of light 111 to the finger 140 above the fingerprint detection region 103, and the light 111 is reflected by a surface of the finger 140 to form reflected light or scattered inside the finger 140 to form scattered light. In related patent applications, the reflected light and scattered light are also collectively referred to as reflected light for convenience of description. Since a ridge 141 and a valley 142 of a fingerprint have different light reflecting abilities, reflected light 151 from the ridge of the fingerprint and reflected light 152 from the valley of the fingerprint have different light intensities. After passing through the optical component 132, the reflected light is received by the sensing array 133 in the optical fingerprint module 130 and converted into a corresponding electrical signal, that is, a fingerprint detection signal. Fingerprint image data can be obtained based on the fingerprint detection signal, and fingerprint matching verification can be further performed, thereby implementing an optical fingerprint detection function in the electronic device 10.

In other implementation manners, the optical fingerprint module 130 may also use an internal light source or an external light source to provide a light signal for fingerprint detection. In this case, the optical fingerprint module 130 may be applied to a non-self-emitting display screen, such as a liquid crystal display screen or other passive light-emitting display screens. As an example, in a case where a liquid crystal display screen having a backlight module and a liquid crystal panel is applied, in order to support under-screen fingerprint detection of the liquid crystal display screen, the optical fingerprint system of the electronic device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the electronic device 10. The optical fingerprint module 130 may be disposed under the liquid crystal panel or the edge region of the protective cover, and allows light for fingerprint detection to reach the optical fingerprint module 130 through light path directing. Alternatively, the optical fingerprint module 130 may also be disposed under the backlight module, and the backlight module allows the light for fingerprint detection to pass through the liquid crystal panel and the backlight module and reach the optical fingerprint module 130 by providing a hole on film layers such as a diffusion sheet, a brightening sheet, a reflection sheet or the like, or by performing other optical designs. When the optical fingerprint module 130 uses an internal light source or an external light source to provide a light signal for fingerprint detection, a detection principle is consistent with the foregoing description.

It should be understood that, in specific implementation, the electronic device 10 may further include a transparent protective cover; and the cover may be a glass cover or a sapphire cover, which is located above the display screen 120 and covers a front surface of the electronic device 10. Therefore, in an embodiment of the present application, the so-called the finger being pressed against the display screen 120 actually refers to the finger being pressed against a cover above the display screen 120 or a surface of a protective layer covering the cover.

The electronic device 10 may further include a circuit board that is disposed under the optical fingerprint module 130. The optical fingerprint module 130 may be bonded to the circuit board by a back adhesive, and achieve electrical connection with the circuit board by welding of a pad and a metal wire. The optical fingerprint module 130 may achieve electrical interconnection and signal transmission with other peripheral circuits or other elements of the electronic device 10 through the circuit board. For example, the optical fingerprint module 130 may receive a control signal of a processing unit of the electronic device 10 through the circuit board, and may also output a fingerprint detection signal from the optical fingerprint module 130 to the processing unit, a control unit, or the like of a terminal device 10 through the circuit board.

In some implementation manners, the optical fingerprint module 130 may only include one optical fingerprint sensor, and in this case, the fingerprint detection region 103 of the optical fingerprint module 130 has a smaller area and a fixed position, and therefore, when an fingerprint input is performed, a user needs to press a finger at a specific position of the fingerprint detection region 103, otherwise the optical fingerprint module 130 may not be able to capture a fingerprint image, thereby resulting in poor user experience. In other alternative embodiments, the optical fingerprint module 130 may include a plurality of optical fingerprint sensors. The plurality of optical fingerprint sensors may be disposed under the display screen 120 side by side in a splicing manner, and sensing regions of the plurality of optical fingerprint sensors collectively constitute the fingerprint detection region 103 of the optical fingerprint module 130. Thus the fingerprint detection region 103 of the optical fingerprint module 130 may be extended to a main region of a lower half part of the display screen, that is, to a customary pressing region of a finger, thereby implementing a blind-press type of fingerprint input operation. Further, when the number of the optical fingerprint sensors is sufficient, the fingerprint detection region 103 may also be extended to a half of the display region or even the entire display region, thereby achieving half-screen or full-screen fingerprint detection.

For example, in the electronic device 10 as shown in FIGS. 2A and 2B, an optical fingerprint module 130 in the electronic device 10 includes a plurality of optical fingerprint sensors, and the plurality of optical fingerprint sensors may be disposed under a display screen 120 side by side in a splicing manner or the like for example, and sensing regions of the plurality of optical fingerprint sensors collectively constitute a fingerprint detection region 103 of the optical fingerprint module 130.

Optionally, corresponding to the plurality of optical fingerprint sensors of the optical fingerprint module 130, an optical component 132 may include a plurality of light directing layers, each light directing layer corresponds to one optical fingerprint sensor and is attached to be disposed above the corresponding optical fingerprint sensor, respectively. Alternatively, the plurality of optical fingerprint sensors may also share an integral light directing layer, i.e., the light directing layer has a sufficiently large area to cover sensing arrays of the plurality of optical fingerprint sensors.

In addition, the optical component 132 may further include other optical elements, for example, a filter or other optical films, which may be disposed between the light directing layer and the optical fingerprint sensor, or between the display screen 120 and the light directing layer, for mainly isolating the influence of external interference light on optical fingerprint detection. The filter may be used to filter out ambient light that penetrates a finger and enters into the optical fingerprint sensors via the display screen 120. Similar to the light directing layer, the filter may be separately provided for each of the optical fingerprint sensors to filter interference light, or a large-area filter may also be used to simultaneously cover the plurality of optical fingerprint sensors.

The light directing layer may also be replaced by an optical lens, and an aperture may be formed by a light-shielding material on the optical lens to cooperate with the optical lens to converge fingerprint detection light to the optical fingerprint sensor under the optical lens so as to achieve fingerprint imaging. Similarly, each optical fingerprint sensor may be separately configured with an optical lens for fingerprint imaging, or the plurality of optical fingerprint sensors may also utilize the same optical lens to achieve light convergence and fingerprint imaging. In other alternative embodiments, each of the optical fingerprint sensors may even further have dual sensing arrays (Dual Array) or multiple sensing arrays (Multi-Arrays), and two or more optical lenses are simultaneously configured to cooperate with the two or more sensing arrays for optical imaging so as to reduce an imaging distance and enhance an imaging effect.

The number, size, and arrangement of the optical fingerprint sensors shown above are only examples, and can be adjusted according to actual needs. For example, the number of the plurality of optical fingerprint sensors may be 2, 3, 4, 5, etc., and the plurality of fingerprint sensors may be distributed in a square or circular shape.

During fingerprint detection, a light source illuminates a finger above a display screen, and an optical fingerprint sensor captures a light signal returned from the finger after reflection or scattering, so as to obtain fingerprint information of the finger. However, if a fingerprint image of the finger is copied and the copied fingerprint image is used for fingerprint detection, a fingerprint password can be easily cracked, causing huge losses to information security and property security.

Therefore, an embodiment of the present application provides a solution for fingerprint detection, which can detect whether a fingerprint of a finger is a 3D fingerprint or a forged 2D fingerprint, that is, whether the finger is a real finger or a fake finger, which is beneficial to improving security of fingerprint detection.

Figure 3:
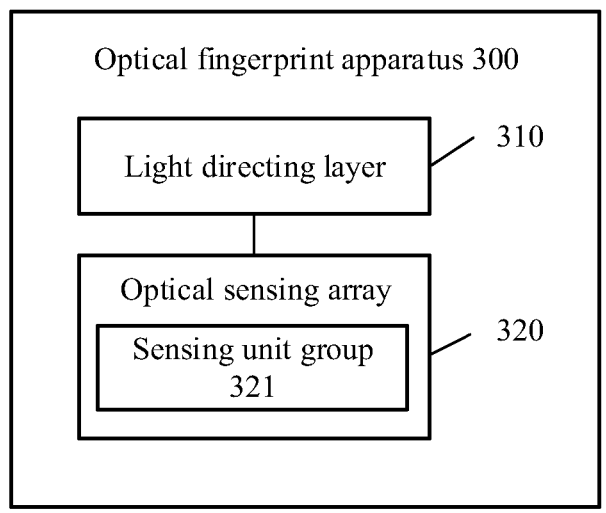
FIG. 3 is a schematic block diagram of an optical fingerprint apparatus according to an embodiment of the present application.

FIG. 3 is a schematic block diagram of an optical fingerprint apparatus according to an embodiment of the present application. An optical fingerprint apparatus 300 is configured to be disposed under a display screen of an electronic device to implement under-screen optical fingerprint detection. The apparatus 300 includes:

a light directing layer 310 configured to direct a light signal returned from a finger above the display screen to an optical sensing array 320 along at least two directions, where the at least two directions are oblique with respect to the display screen, and projections of the at least two directions on the display screen are at different angles with a polarization direction of the display screen; and the optical sensing array 320 including a plurality of sensing unit groups 321, each sensing unit group 321 including at least two optical sensing units, and each optical sensing unit of the at least two optical sensing units being configured to receive a light signal in one direction of the at least two directions, where light signals in the at least two directions are used to obtain a fingerprint image of the finger, and a difference between the light signals in the at least two directions received by the sensing unit group 321 is used to determine whether the finger is a real finger.

That is, light signals received by the at least two optical sensing units in each sensing unit group are oblique light signals in at least two directions, and the projections of the oblique light signals in the at least two directions on the display screen are at different angles with the polarization direction of the display screen. For a real finger, it is a 3D model, and the light signals in the at least two directions captured by the sensing unit group exhibit different polarization characteristics, while for a fake finger, it is a 2D model, diffuse reflection approximately occurs, and thus polarization characteristics of the light signals in the at least two directions captured by the sensing unit group are similar or the same. Therefore, based on a difference between light signals in different directions captured by the sensing unit group, a real or fake finger can be determined.

In some embodiments, the at least two directions may include a first direction and a second direction, a projection of the first direction on the display screen is at a first angel with the polarization direction of the display screen, a projection of the second direction on the display screen is at a second angel with the polarization direction of the display screen, and the first angle is different from the second angle.

The embodiment of the present application does not specifically limit the angles formed by the projections of the at least two directions on the display screen and the polarization direction of the display screen.

As an example, the first angle is zero degree, or 180 degrees, and the second angle is 90 degrees, that is, a projection of the first direction on the display screen is parallel to the polarization direction of the display screen, and a projection of the second direction on the display screen is perpendicular to the polarization direction of the display screen.

The embodiment of the present application does not specifically limit the number of the at least two directions.

For example, the number of the at least two directions may be 2, 3, 4, etc.

The embodiment of the present application does not particularly limit the number and arrangement of optical sensing units included in the sensing unit group.

For example, the number of optical sensing units included in the sensing unit group may be the same as the number of the at least two directions, that is, one optical sensing unit in the sensing unit group is configured to receive a light signal in one direction. As shown in FIG. 5, "1", "2", "3" and "4" represent different optical sensing units, or photosensitive regions, which are configured to receive light signals in different directions, respectively, and a sensing unit group may include optical sensing units represented by "1", "2", "3" and "4" in two rows and two columns.

For another example, the number of optical sensing units included in the sensing unit group may also be greater than the number of the at least two directions, for example, two or more optical sensing units in the sensing unit group are configured to receive a light signal in one direction. As shown in FIG. 7, "1", "2", "3" and "4" represent different optical sensing units, or photosensitive regions, which are configured to receive light signals in different directions, respectively; and a sensing unit group may include optical sensing units represented by "1", "2", "3" and "4" in four rows and four columns, that is, each sensing unit group may include four optical sensing units for receiving a light signal in the same direction.

Further, the optical sensing units included in the sensing unit group may be arranged adjacently, or may also be discretely arranged.

The embodiment of the present application does not limit magnitudes of included angles between the at least two directions and a normal direction of an incident surface of the display screen.

As some examples, the included angles between the at least two directions and the normal direction of the incident surface may be 30 degrees or less than 30 degrees.

Figure 4:
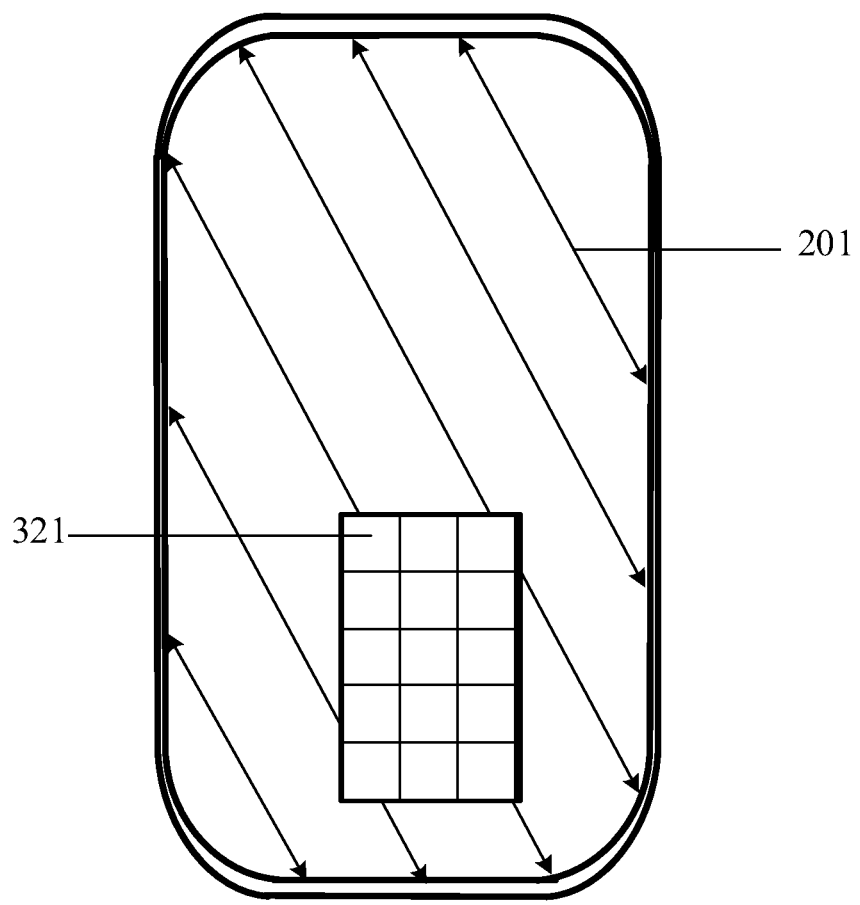
FIG. 4 is a front view of an electronic device to which an optical fingerprint apparatus according to an embodiment of the present application is applied.

FIGS. 4 to 6 show a typical implementation manner of a sensing unit group, in which FIG. 4 is a front view of an electronic device to which an optical fingerprint apparatus is applied, FIG. 5 is an enlarged view of the optical fingerprint apparatus in FIG. 4, and FIG. 6 is an oblique view of a sensing unit group in the optical fingerprint apparatus receiving light signals in different directions.

The sensing unit group 321 includes four optical sensing units in two rows and two columns (denoted as a first optical sensing unit corresponds to a photosensitive region 1, a second optical sensing unit corresponds to a photosensitive region 2, a third optical sensing unit corresponds to a photosensitive region 3, and a fourth optical sensing unit corresponds to a photosensitive region 4), the at least two directions include a first direction 221, a second direction 222, a third direction 223, and a fourth direction 224, and the four optical sensing units are respectively configured to receive light signals in the above four directions. Specifically, the photosensitive region 1 is used to receive a light signal in the first direction 221, the photosensitive region 2 is used to receive a light signal in the second direction 222, the photosensitive region 3 is used to receive a light signal in the third direction 223, and the photosensitive region 4 is used to receive a light signal in the fourth direction 224.

As a typical example, projections of the first direction and the fourth direction on the display screen are parallel to the polarization direction of the display screen, and projections of the second direction and the third direction on the display screen are perpendicular to the polarization direction of the display screen That is, the first optical sensing unit and the fourth optical sensing unit receive light signals that are parallel to the polarization direction of the display screen, and the second optical sensing unit and the third optical sensing unit receive light signals that are perpendicular to the polarization direction of the display screen.

In some embodiments, the first optical sensing unit and the fourth optical sensing unit are located on a diagonal line, and the second optical sensing unit and the third optical sensing unit are located on a diagonal line.

In some embodiments, the photosensitive regions represented by "1", "2", "3" and "4" can be respectively used to generate a fingerprint image, that is, a total of four fingerprint images can be generated, and these four fingerprint images can be used to be merged into a high-resolution fingerprint image, and performing fingerprint identification based on the high-resolution fingerprint image is beneficial to improving an identification effect of the optical fingerprint apparatus.

With reference to FIGS. 8 to 11, a principle of an optical fingerprint apparatus for real and fake fingerprint identification according to an embodiment of the present application will be described.

Figure 8:
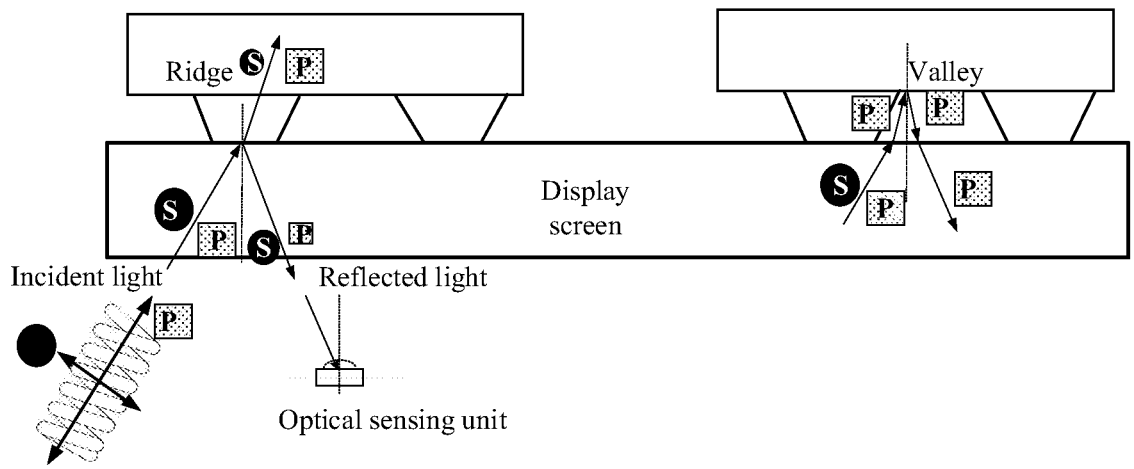
FIG. 8 is a schematic diagram of light path transmission of a fingerprint ridge and a fingerprint valley when a real finger is pressed against a display screen.

Referring to FIG. 8, when a real finger is pressed against a display screen, since blood and tissues exist in a fingerprint ridge of the real finger, light incident on the fingerprint ridge will be absorbed by the fingerprint ridge, and less light exits from the fingerprint ridge, and thus light path transmission of the fingerprint ridge belongs to a reflection model from an optically denser medium to an optically thinner medium. And there is an air gap between a fingerprint valley and the display screen, which causes light incident on the fingerprint valley to be reflected at a glass-air interface, and more light exits from the fingerprint valley, and thus the fingerprint valley belongs to a refraction-reflection-refraction model.

In the embodiment of the present application, fingerprint detection is performed based on oblique light. Therefore, after a light signal is reflected by a finger, the light signal returned from the finger includes an S wave and a P wave. The P wave is consistent with a propagation direction of the light signal, and the S wave is perpendicular to the propagation direction of the light signal.

To simplify the description below, the photosensitive region 1 and the photosensitive region 4 are denoted as a photosensitive region 14, and the photosensitive region 2 and the photosensitive region 3 are denoted as a photosensitive region 23.

Based on a light path design shown in FIG. 6, for fingerprint ridge imaging, since a direction of a light signal received by the photosensitive region 14 is parallel to a polarization direction of the display screen, and a direction of a light signal received by the photosensitive region 23 is perpendicular to the polarization direction of the display screen, a P wave in the light signal received by the photosensitive region 14 can be transmitted, but an S wave is blocked, whereas an S wave in the light signal received by the photosensitive region 23 can be transmitted, but a P wave is blocked.

Generally, when an angle of incidence is less than Brewster's angle, energy of an S wave in reflected light is significantly greater than energy of a P wave. Assuming that energy of incident light is E, the energy of the S wave is 0.13E, and the energy of the P wave is 0.01E. In addition, as the angle of incidence increases, the energy of the S wave gradually increases, and the energy of the P wave gradually decreases. Therefore, sharpness of a fingerprint image in the photosensitive region 23 is significantly higher than sharpness of a fingerprint image in the photosensitive region 14.

For fingerprint valley imaging, since the fingerprint valley belongs to a refraction-reflection-refraction model, according to the Fresnel formula, a deflection angle of a light signal is smaller during a refraction process, and a region not in contact with the display screen reflects more light. Reflection of the fingerprint valley surface is approximate to specular reflection, so polarization states of reflected light and incident light do not change. Therefore, for the photosensitive region 23 and the photosensitive region 14, a difference between received fingerprint valley signals is not large. Assuming energy of the incident light is E, energy of a fingerprint valley signal received by the photosensitive region 23 is approximately 0.7E, and energy of a fingerprint valley signal received by the photosensitive region 14 is approximately 0.7E.

Thus it can be seen that for the photosensitive region 23 and the photosensitive region 14 where the direction of the received light signal is inconsistent with the polarization direction of the display screen, a fingerprint ridge signal of a 3D real finger is obviously different, whereas a fingerprint valley signal is similar, and a signal amount quantized by a light signal captured by the photosensitive region 23 is higher than a signal amount quantified by a light signal captured by the photosensitive region 14. For example, the signal amount in the photosensitive region 23 is a signal amount of a fingerprint valley signal in the photosensitive region 23 minus a signal amount of a fingerprint ridge signal in the photosensitive region 23, the signal amount in the photosensitive region 14 is a signal amount of a fingerprint valley signal in the photosensitive region 14 minus a signal amount of a fingerprint ridge signal in the photosensitive region 14, and thus a difference value between the signal amounts in the two photosensitive regions is equal to the signal amount in the photosensitive region 23 minus the signal amount in the photosensitive region 14, that is, 0.12E.

Figure 9:
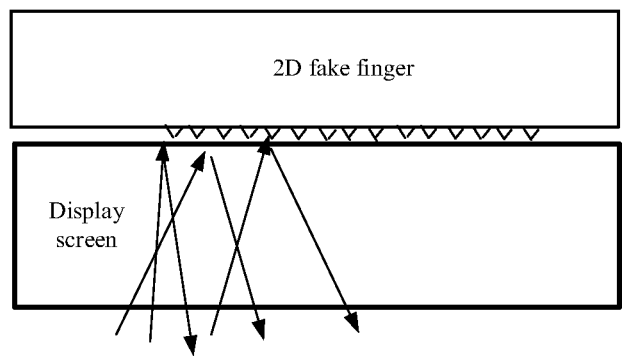
FIG. 9 is a schematic diagram of light path transmission when a fake finger is pressed against a display screen.

Refer to FIG. 9, for a 2D fake fingerprint, it is a planar image, so there is no difference between a fingerprint valley and a fingerprint ridge, and its reflection model is approximate to diffuse reflection, that is, a received light signal is not affected by a polarization direction of a display screen. Therefore, for the photosensitive region 23 and the photosensitive region 14, signal amounts of fingerprint signals quantized by received light signals are approximate.

Based on the above difference, a 3D real finger and a 2D fake finger can be distinguished according to a difference of light signals captured by optical sensing units at different angles with a polarization direction of a display screen. For example, a 3D real finger can be determined according to a difference or ratio of signal amounts in different regions.

For example, if a difference value between a signal amount in the photosensitive region 23 and a signal amount in the photosensitive region 14 falls within a first range, it is determined that the finger is a 3D real finger; or if a difference value between a signal amount in the photosensitive region 23 and a signal amount in the photosensitive region 14 does not fall within a first range, it is determined that the finger is a fake finger.

In some implementation manners, the first range is a range of a difference value between signal amounts in two regions obtained by training based on a large number of fingerprint samples of real and fake fingers.

For another example, if a ratio of a signal amount in the photosensitive region 23 to a signal amount in the photosensitive region 14 falls within a second range, it is determined that the finger is a 3D real finger; or if a ratio of a signal amount in the photosensitive region 23 to a signal amount in the photosensitive region 14 does not fall within a second range, it is determined that the finger is a fake finger.

It should be noted that the second range is a range of a ratio of signal amounts in two regions obtained by training based on a large number of fingerprint samples of real and fake fingers.

In other optional embodiments, other differences between light signals in different directions may also be used, for example, a difference in a modulation transfer function (MTF), spatial noise, or a contrast is used to determine whether a target from which the light signal comes is a real finger or a fake finger.

Following the above examples, for example, if a difference value between a contrast of a light signal received by the photosensitive region 23 and a contrast of a light signal received by the photosensitive region 14 is within a third range, it is determined that the finger is a real finger, otherwise it is determined that the finger is a fake finger; alternatively, if a ratio of a contrast of a light signal received by the photosensitive region 23 to a contrast of a light signal received by the photosensitive region 14 is within a fourth range, it is determined that the finger is a real finger, otherwise it is determined that the finger is a fake finger.

For another example, if a difference value between an MTF of a light signal received by the photosensitive region 23 and an MTF of a light signal received by the photosensitive region 14 is within a fifth range, it is determined that the finger is a real finger, otherwise it is determined that the finger is a fake finger; alternatively, if a ratio of an MTF of a light signal received by the photosensitive region 23 to an MTF of a light signal received by the photosensitive region 14 is within a sixth range, it is determined that the finger is a real finger, otherwise it is determined that the finger is a fake finger.

Similarly, the third range may be a range of a difference value of contrasts in two photosensitive regions obtained by training based on a large number of fingerprint samples of real and fake fingers, the fourth range may be a range of a ratio of contrasts in two photosensitive regions obtained by training based on a large number of fingerprint samples of real and fake fingers, the fifth range may be a range of a difference value of MTFs in two photosensitive regions obtained by training based on a large number of fingerprint samples of real and fake fingers, and the sixth range may be a range of a ratio of MTFs in two photosensitive regions obtained by training based on a large number of fingerprint samples of real and fake fingers.

Hereinafter, specific implementation of the light directing layer 310 will be described with reference to specific embodiments.

In some embodiments of the present application, the light directing layer 310 may include:

a micro-lens array including a plurality of micro-lenses for converging the light signals in the at least two directions; and at least one light shielding layer disposed below the micro-lens array, where each light shielding layer includes multiple groups of holes corresponding to the plurality of micro-lenses, and the plurality of micro-lenses are configured to direct the light signals in the at least two directions to the optical sensing array through corresponding multiple groups of holes in the at least one light shielding layer.

In some embodiments of the present application, the at least one light shielding layer is a plurality of light shielding layers, and one hole in an array of small holes in a light shielding layer of the plurality of light shielding layers corresponds to one optical sensing unit in the sensing unit group; alternatively, one hole in an array of small holes in the plurality of light shielding layers corresponds to a plurality of optical sensing units, for example, corresponding to at least two optical sensing units in the sensing unit group.

As an implementation manner, one hole in an array of small holes in a top light shielding layer of the plurality of light shielding layers corresponds to at least two optical sensing units in the sensing unit group. As another implementation manner, one hole in an array of small holes in a top light shielding layer of the plurality of light shielding layers corresponds to one optical sensing unit.

Optionally, apertures of holes in the plurality of light shielding layers corresponding to a same optical sensing unit sequentially decrease from top to bottom. In some other embodiments of the present application, the at least one light shielding layer is one light shielding layer (or referred to as a bottom light shielding layer), and one hole in an array of small holes in the one light shielding layer corresponds to one optical sensing unit in the sensing unit group, or one hole in an array of small holes in the one light shielding layer corresponds to a plurality of optical sensing units, for example, corresponding to at least two optical sensing units in the sensing unit group.

As an implementation manner, a metal wiring layer of the optical sensing array is disposed at a back focal plane position of the micro-lens array, and the metal wiring layer is provided with one hole formed above each optical sensing unit in the optical sensing array to form the bottom light shielding layer.

In some implementation manners, the number of the plurality of micro-lenses in the micro-lens array is less than the number of the optical sensing units in the optical sensing array.

As an implementation manner, each micro-lens of the plurality of micro-lenses corresponds to one sensing unit group of the plurality of sensing unit groups, the micro-lens is disposed above a corresponding sensing unit group, and the micro-lens is configured to direct the light signals in the at least two directions to the at least two optical sensing units in the corresponding sensing unit group through a group of holes in the at least one light shielding layer corresponding to the micro-lens.

By arranging a plurality of optical sensing units below one micro-lens, when the number of the plurality of micro-lenses is not equal to the number of the optical sensing units in the optical sensing array, a spatial period of the micro-lens (that is, a distance between adjacent micro-lenses) can be made not to be equal to a spatial period of the optical sensing unit (that is, a distance between adjacent optical sensing units), which can avoid moiré fringes in a fingerprint image and improve a fingerprint identification effect. In particular, when the number of the plurality of micro-lenses is less than the number of the optical sensing units in the optical sensing array, cost of the lenses can be reduced and density of the optical sensing units can be increased, thereby reducing size and cost of the optical fingerprint apparatus.

In this case, each light shielding layer of the at least one light shielding layer is provided with a group of holes corresponding to each micro-lens. For example, a group of holes in the light shielding layer corresponding to each micro-lens include one hole for directing a light signal incident on the micro-lens to the at least two optical sensing units in the sensing unit group, or a group of holes in the light shielding layer corresponding to each micro-lens include at least two holes corresponding to the at least two optical sensing units in the sensing unit group respectively, and the micro-lens is configured to direct an incident light signal to the at least two optical sensing units in the sensing unit group through the at least two holes.

A connecting line direction of holes in the at least one light shielding layer corresponding to an optical sensing unit is one of the at least two directions, that is, by setting a position of a hole in the at least one light shielding layer corresponding to an optical sensing unit, a direction of a light signal that the optical sensing unit can receive can be formed.

Figure 10:
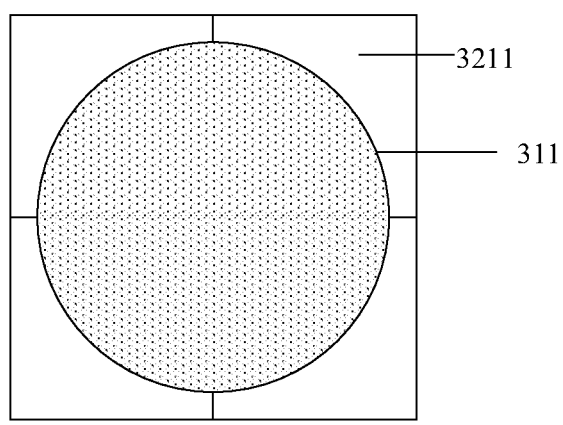
FIG. 10 is a schematic diagram of an example of a correspondence relationship between a micro-lens and an optical sensing unit in a sensing unit group according to an embodiment of the present application.

As an example, in a sensing unit group shown in FIG. 5, the sensing unit group may include four optical sensing units 3211 in 2×2, and the corresponding micro-lens 311 may be disposed above the four optical sensing units in 2×2, as shown in FIG. 10.

Figure 11:
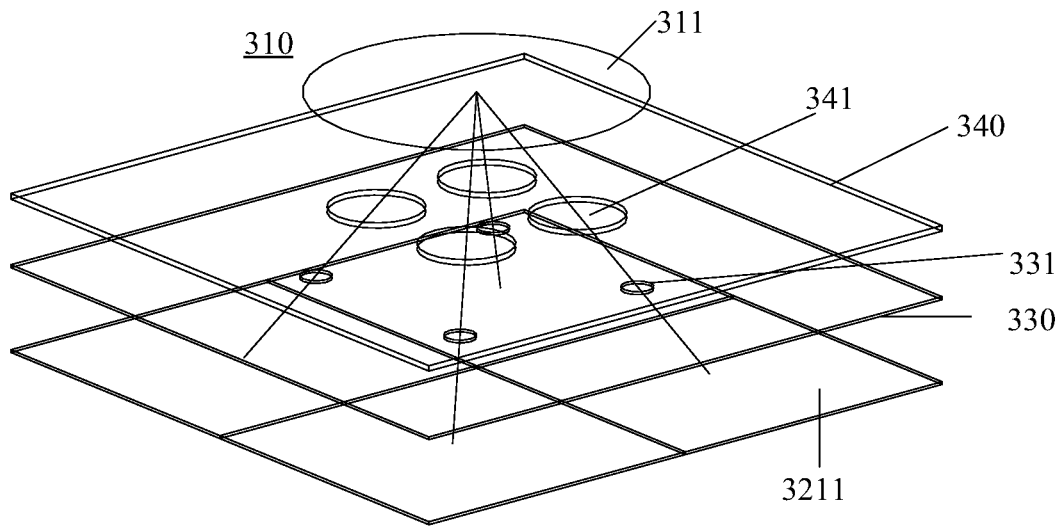
FIG. 11 is a schematic diagram of an example of a design of the micro-lens in FIG. 10 and a light shielding layer.
Figure 12:
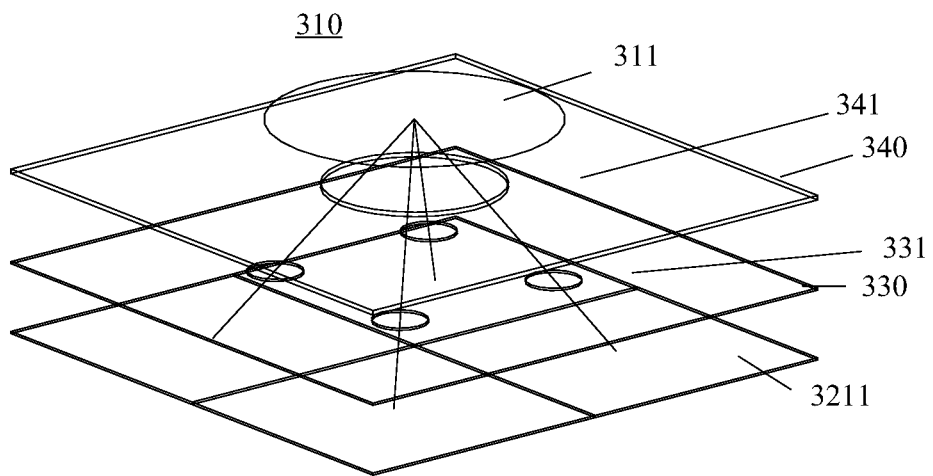
FIG. 12 is a schematic diagram of another design of the micro-lens in FIG. 10 and a light shielding layer.

FIGS. 11 and 12 show an arrangement manner of holes in two light shielding layers when the at least one light shielding layer includes the two light shielding layers.

The at least one light shielding layer includes a bottom light shielding layer 330 and a top light shielding layer 340.

In one implementation, as shown in FIG. 11, the bottom light shielding layer 330 is provided with a hole 331 corresponding to each optical sensing unit 3211 of the four optical sensing units, and the top light shielding layer 340 is provided with a hole 341 corresponding to each optical sensing unit 3211 of the four optical sensing units, where a connecting line direction of holes in the bottom light shielding layer 330 and the top light shielding layer 340 that are corresponding to a same optical sensing unit is used to control a direction of a light signal received by the optical sensing unit.

That is, an oblique angle of a connecting line of holes in respective light shielding layers corresponding to a same micro-lens determines an oblique angle of a light signal reaching an optical sensing unit. The holes in the respective light shielding layers corresponding to the same micro-lens are sequentially shifted from top to bottom, so that a light signal in the corresponding direction is transmitted to the corresponding optical sensing unit. In some embodiments, the bottom light shielding layer 330 may be integrated in the optical sensing array, thereby improving reliability.

In another implementation, as shown in FIG. 12, the bottom light shielding layer 330 is provided with a hole 331 corresponding to each optical sensing unit 3211 of the four optical sensing units, and the top light shielding layer 340 is provided with one hole 341 corresponding to the four optical sensing units, that is, holes corresponding to the four optical sensing units can be combined into a large hole, which is beneficial to reducing processing difficulty, increases an amount of convergent light signals, and further improves a fingerprint identification effect of the optical fingerprint apparatus. A connecting line direction of the hole 341 in the top light shielding layer 340 and the hole 331 in the bottom light shielding layer 330 that is corresponding to each optical sensing unit is used to control a direction of a light signal received by the each optical sensing unit.

In the specific light path design, a hole in the at least one light shielding layer provided under one micro-lens corresponding to the four optical sensing units 3211 can make the one micro-lens receive oblique light signals in the at least two directions along a diagonal line direction of the 2×2 optical sensing unit array, and the one micro-lens can respectively converge the oblique light signals in the at least two directions to optical sensing units in the sensing unit group along the diagonal line direction to increase an amount of signals that each optical sensing unit can receive, thereby improving a fingerprint identification effect.

In some other implementation manners, the number of the plurality of micro-lenses in the micro-lens array is equal to the number of the optical sensing units in the optical sensing array.

For example, each micro-lens of the plurality of micro-lenses corresponds to one optical sensing unit, the micro-lens is disposed obliquely above or below a corresponding optical sensing unit, and the micro-lens is configured to direct an oblique light signal in one direction of the at least two directions to the optical sensing unit through a hole in the at least one light shielding layer corresponding to the optical sensing unit.

Figure 13:
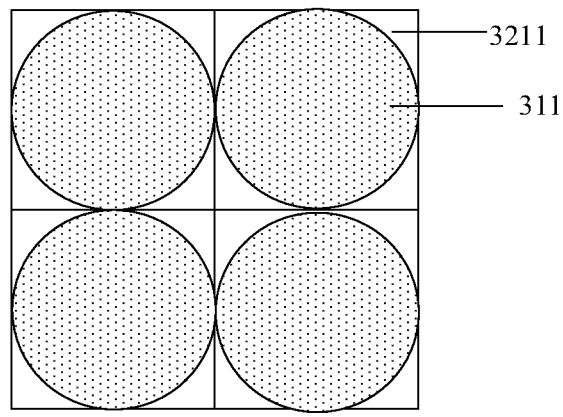
FIG. 13 is a schematic diagram of another example of a correspondence relationship between a micro-lens and an optical sensing unit in a sensing unit group according to an embodiment of the present application.

As an example, in a sensing unit group shown in FIG. 5, the sensing unit group may include four optical sensing units 3211 in 2×2, and a micro-lens 311 is provided obliquely above each of the four optical sensing units in 2×2, as shown in FIG. 13.

In a light transmission process, an array of 2×2 micro-lenses receive oblique light signals in the at least two directions, and each micro-lens in the array of 2×2 micro-lenses converges a received oblique light signal to an optical sensing unit below an adjacent micro-lens in a clockwise direction, or each micro-lens in the rectangular array of 2×2 micro-lenses converges a received oblique light signal to an optical sensing unit below an adjacent micro-lens in a counterclockwise direction.

As explained with reference to FIG. 13, the four micro-lenses 311 may respectively converge the oblique light signals in the at least two directions to the four optical sensing units 3211 along the following paths: a micro-lens 311 in an upper right corner converges a received oblique light signal to an optical sensing unit 3211 in an upper left corner, a micro-lens 311 in an upper left corner converges a received oblique light signal to an optical sensing unit 3211 in a lower left corner, a micro-lens 311 in a lower left corner converges a received oblique light signal to an optical sensing unit 3211 in a lower right corner, and a micro-lens 311 in a lower right corner converges a received oblique light signal to an optical sensing unit 3211 in an upper right corner.

Further, the optical fingerprint apparatus can generate at least two fingerprint images based on the received light signals in the at least two directions, and then obtain one high-resolution fingerprint image, so as to improve a fingerprint identification effect.

Figure 14:
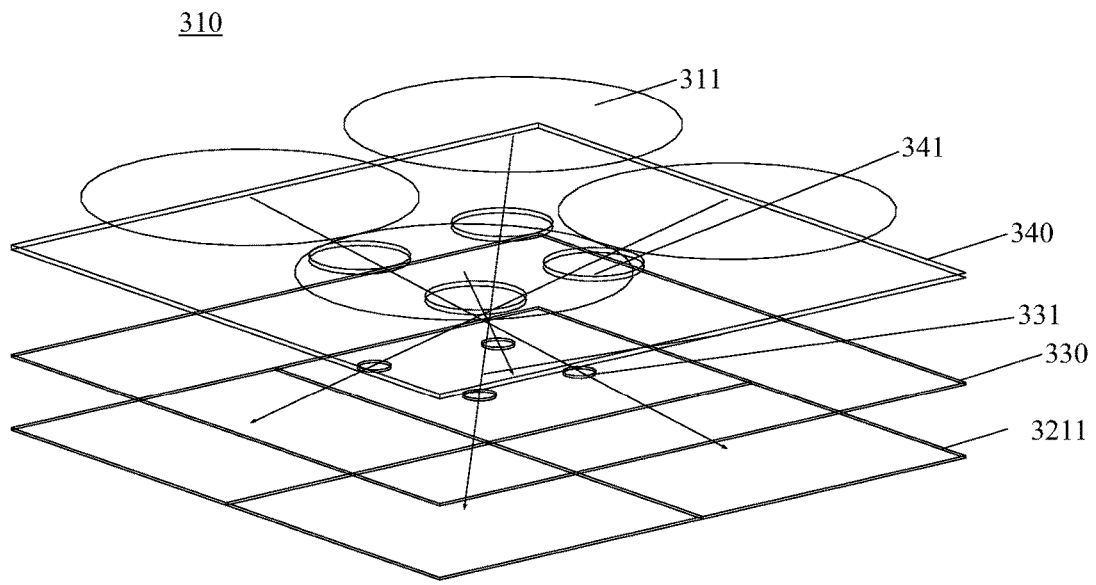
FIG. 14 is a schematic diagram of an example of a design of the micro-lens in FIG. 13 and a light shielding layer.
Figure 15:
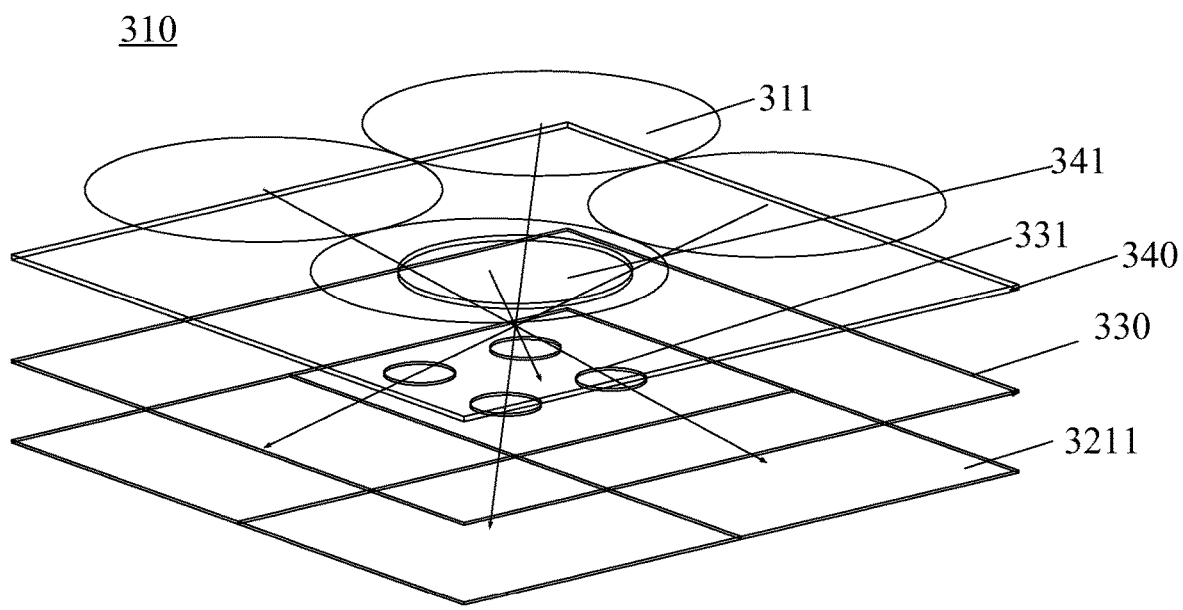
FIG. 15 is a schematic diagram of another design of the micro-lens in FIG. 13 and a light shielding layer.

FIGS. 14 and 15 show an arrangement manner of holes in two light shielding layers when the at least one light shielding layer includes the two light shielding layers.

The at least one light shielding layer includes a bottom light shielding layer 330 and a top light shielding layer 340.

In one implementation, as shown in FIG. 14, the bottom light shielding layer 330 is provided with a hole 331 corresponding to each optical sensing unit 3211 of the four optical sensing units, and the top light shielding layer 340 is provided with a hole 341 corresponding to each optical sensing unit 3211 of the four optical sensing units, where a connecting line direction of holes in the bottom light shielding layer 330 and the top light shielding layer 340 that are corresponding to a same optical sensing unit is used to control a direction of a light signal received by the optical sensing unit.

In another implementation, as shown in FIG. 15, the top light shielding layer 340 is provided with one hole 341 corresponding to the four optical sensing units, that is, in the top light shielding layer 340, one hole corresponds to one sensing unit group, and the bottom light shielding layer 330 is provided with a hole 331 corresponding to each optical sensing unit 3211 of the four optical sensing units. A connecting line direction of the hole 341 in the top light shielding layer 340 and the hole 331 in the bottom light shielding layer 330 that is corresponding to each optical sensing unit is used to control a direction of a light signal received by the each optical sensing unit.

It should be noted that hole providing methods in a light shielding layer in FIGS. 11-12 and FIGS. 14-15 are only described by taking the sensing unit group shown in FIG. 5 as an example, and the implementation manners may be applied to various embodiments of the present application, which is not limited by the present application. For example, the at least one light shielding layer may be more than two light shielding layers. Alternatively, the at least one light shielding layer may be one light shielding layer, for example, the at least one light shielding layer may be an oblique-hole collimator with a certain thickness.

It should also be understood that FIGS. 14 to 15 are only examples in which one micro-lens is disposed above each optical sensing unit, and should not be construed as a limitation of the present application. For example, in other implementation manners, the one micro-lens is multiple rows of micro-lenses, and the plurality of optical sensing units are multiple rows of optical sensing units corresponding to the multiple rows of micro-lenses, where each row of optical sensing units in the multiple rows of optical sensing units are alternately disposed below the corresponding row of micro-lenses. Optionally, the multiple rows of micro-lenses may be multiple columns or lines of micro-lenses. The multiple rows of optical sensing units may be multiple columns or lines of optical sensing units.

Hereinafter, specific light path transmission is illustrated by an example that one micro-lens corresponds to one sensing unit group.

Figure 16:
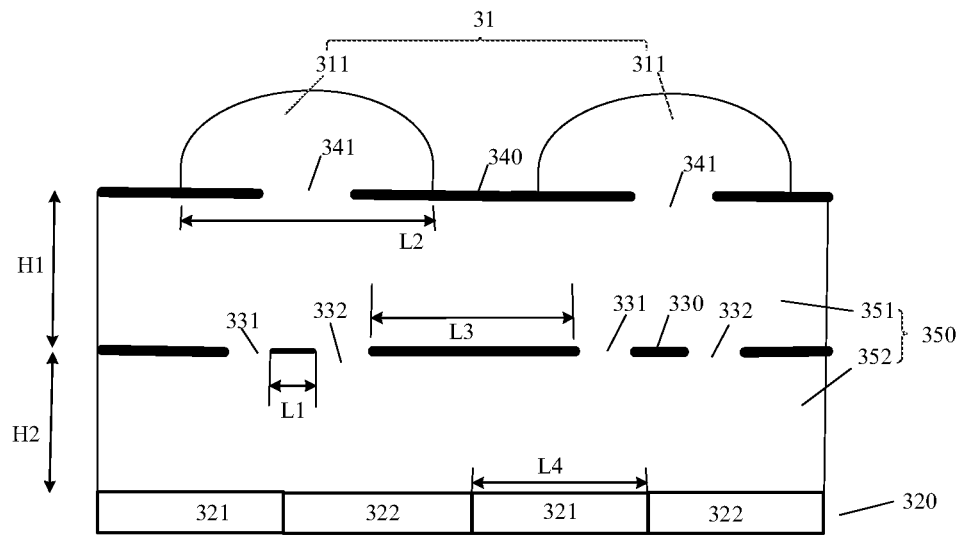
FIG. 16 is a schematic diagram of an example of a light directing layer according to an embodiment of the present application.

Referring to FIG. 16, the sensing unit group may include a plurality of optical sensing units, such as an optical sensing unit 321 and an optical sensing unit 322, or may also be four optical sensing units shown in FIG. 5.

A micro-lens array 31 includes a plurality of micro-lenses 311.

The at least one light shielding layer includes a bottom light shielding layer 330 and a top light shielding layer 340, where the bottom light shielding layer 330 and the top light shielding layer 340 are respectively provided with a group of holes corresponding to each micro-lens of the plurality of micro-lenses.

For example, the bottom light shielding layer 330 is provided with a first hole 331 and a second hole 332 corresponding to the micro-lens 311. The top light shielding layer 340 is provided with a third hole 341 corresponding to the micro-lens 311. It should be understood that the number of holes in the top light shielding layer may be one, or each optical sensing unit in the sensing unit group may correspond to one hole.

The optical sensing unit in the sensing unit group disposed below the micro-lens 311 is configured to receive an oblique light signal converged by the micro-lens and transmitted through the holes in the bottom light shielding layer and the top light shielding layer.

Specifically, the optical sensing unit 321 may receive an oblique light signal converged by the micro-lens 311 and transmitted through the third hole 341 and the first hole 331, and the optical sensing unit 322 may receive an oblique light signal converged by the micro-lens 311 and transmitted through the third hole 341 and the second hole 332.

A connecting line of centers of the first hole 331 and the third hole 341 forms the first direction, and a connecting line of centers of the second hole 332 and the third hole 341 forms the second direction.

In some embodiments of the present application, the light directing layer may further include a transparent medium layer 350.

The transparent medium layer 350 may be disposed at at least one of the following positions: a position between the micro-lens array 31 and the at least one light shielding layer; a position between the at least one light shielding layer; and a position between the at least one light shielding layer and the optical sensing array 320.

For example, the transparent medium layer 350 may include a first medium layer 351 between the micro-lens array 31 and the at least one light shielding layer (that is, the bottom light shielding layer 330) and a second medium layer 352 between the bottom light shielding layer 330 and the optical sensing array 320.

A material of the transparent medium layer 350 is any transparent material that is transparent to light, such as glass, or may be transitioned by air or vacuum, which is not specifically limited in the present application.

By setting at least one of a bottom surface size L2 of the micro-lens 311, a radius of the micro-lens, a distance H2 between the bottom light shielding layer 330 and the optical sensing array 320, a distance H1 between the top light shielding layer 340 and the bottom light shielding layers 330, a distance L1 between holes corresponding to two adjacent optical sensing units in the same sensing unit group, and a distance L3 between holes corresponding to different sensing unit groups, an angle of a light signal entering the optical sensing unit and a size of the optical sensing unit are designed.

In addition, the oblique light signals in the at least two directions can be subjected to non-frontal light imaging (that is, oblique light imaging) through a single micro-lens, which can shorten a thickness of a light path design layer between the micro-lens and the optical sensing unit array, and furthermore, effectively reduce a thickness of the optical fingerprint apparatus.

In some other embodiments of the present application, the light directing layer 310 may include:

a plurality of light directing channels, each light directing channel of the plurality of light directing channels is configured to transmit a light signal in one direction, where the light directing channel is disposed obliquely with respect to the display screen.

Each light directing channel of the plurality of light directing channels corresponds to one optical sensing unit, or each light directing channel corresponds to a plurality of optical sensing units, and an oblique direction of the light directing channel is a direction of a light signal received by the corresponding optical sensing unit.

That is, the light directing channel is an oblique channel, and has a certain oblique angle with respect to the display screen, so that a light signal whose transmission direction is the same as an oblique direction of the light directing channel can be transmitted to an optical sensing unit through the light directing channel, while a light signal in another direction is blocked.

In some embodiments, the light directing channel may be formed of air through holes or light-transmitting materials. For example, the light directing layer may be an oblique-hole collimator with different angles.

In still other embodiments of the present application, the light directing layer 310 includes:

a plurality of optical fibers, where each optical fiber of the plurality of optical fibers corresponds to at least one optical sensing unit, and light signals input to the plurality of optical fibers are transmitted in the plurality of optical fibers based on total reflection to reach corresponding optical sensing units.

Figure 17:
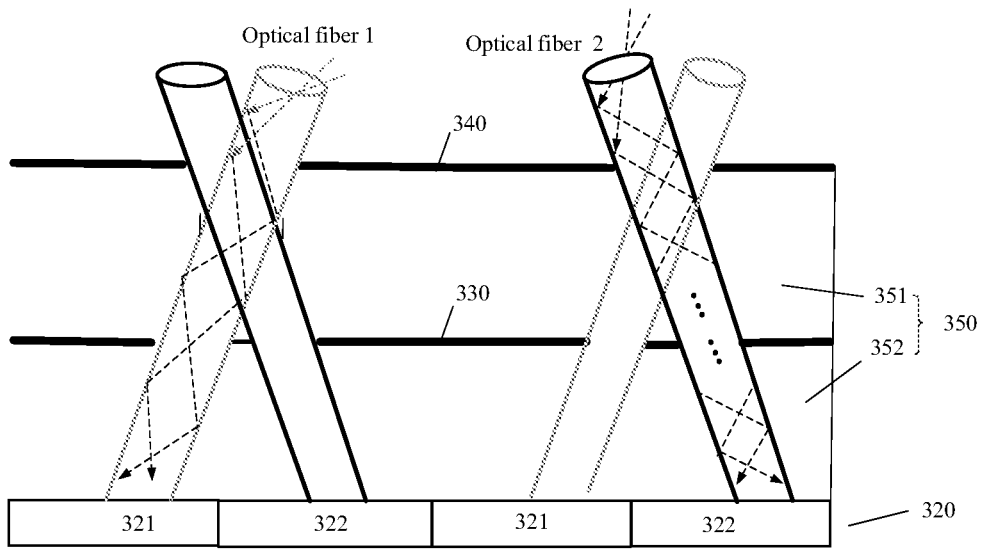
FIG. 17 is a schematic diagram of another example of a light directing layer according to an embodiment of the present application.

Specifically, transmission of a light signal in an optical fiber is based on a principle of total reflection. Due to a difference in refractive index between a core and a cladding of an optical fiber, a light signal meeting a total reflection angle will be totally reflected at an interface between the core and the cladding, so that a qualified light signal is locked inside the core and propagates forward. As shown in FIG. 17, the light signal enters at one end of the optical fiber, and exits from the other end of the optical fiber channel after undergoing at least one total reflection in the optical fiber.

In other alternative embodiments, the light directing layer 310 includes an optical functional film layer 314 for transmitting light signals in the at least two directions and blocking light signals in other directions.

The optical functional film layer 314 may be, for example, a grating film or a prism film.

Figure 18:
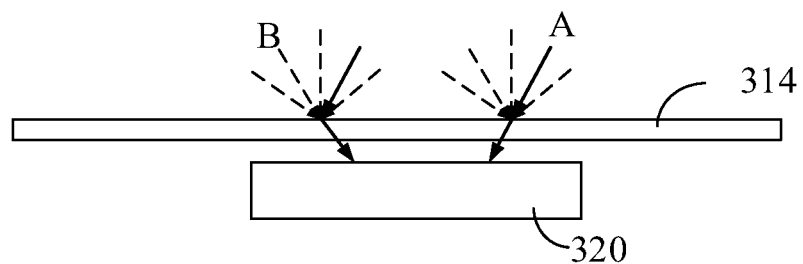
FIG. 18 is a schematic diagram of an optical functional film layer according to an embodiment of the present application.

For example, as shown in FIG. 18, the optical functional film layer 314 may select a light signal in a fixed direction among light signals in various directions and allow it to exit from the optical functional film layer 314, so that the light signal in the fixed direction can reach an optical sensing array. Light signals in other directions are attenuated or reflected, and thus cannot exit from the optical functional film layer 314.

It should be understood that, in the embodiment of the present application, the micro-lens may be various lenses with a convergence function, which are configured to increase a field of view and increase an amount of light signals transmitted to photosensitive pixels. A material of the micro-lens may be an organic material such as resin.

It should also be understood that, in the embodiment of the present application, the optical sensing unit may be a photosensor for converting a light signal into an electrical signal. Optionally, the optical sensing unit may be a complementary metal oxide semiconductor (CMOS) device, that is, a semiconductor device composed of a PN junction, and having a unidirectional conductive property. Optionally, the optical sensing unit has a light sensitivity greater than a first predetermined threshold and a quantum efficiency greater than a second predetermined threshold for blue light, green light, red light, or infrared light. For example, the first predetermined threshold may be 0.5 v/lux-sec and the second predetermined threshold may be 40%. That is, a photosensitive pixel has a high light sensitivity and a high quantum efficiency for blue light (having a wavelength of 460±30 nm), green light (having a wavelength of 540±30 nm), red light or infrared light (having a wavelength greater than or equal to 610 nm) to facilitate detection of the corresponding light.

It should be noted that the embodiment of the present application does not limit the specific shapes of the microlens and the optical sensing unit. For example, each optical sensing unit in the optical sensing array may be a polygon such as a quadrangle or a hexagon, or may be other shapes, such as a circle, so that the optical sensing unit in the optical sensing array has a higher symmetry, a higher sampling efficiency, an equal distance between adjacent pixels, a better angular resolution, and less aliasing effects. In addition, the above parameters of the optical sensing unit may correspond to light required for fingerprint identification. For example, if light required by a fingerprint apparatus is only light of one wavelength band, the above parameters of the optical sensing unit only need to meet requirements of the light in this wavelength band.

An embodiment of the present application further provides an electronic device, and the electronic device may include a display screen and an optical fingerprint apparatus, where the optical fingerprint apparatus is disposed under the display screen to implement under-screen optical fingerprint detection.

It should be understood that the optical fingerprint apparatus may be the optical fingerprint apparatus 300 in the foregoing embodiment. For specific description, please refer to the foregoing embodiment, and details are not described herein again.

For the display screen, reference may be made to related implementation manners of the display screen 120 in FIGS. 1A to 2B, such as an OLED display screen or other display screens. For brevity, details are not described herein again.

In a specific embodiment, the display screen is an OLED display screen, and the optical fingerprint apparatus employs some of display units of the OLED display screen as an excitation light source for optical fingerprint detection.

It should be understood that specific examples in embodiments of the present application are just for helping those skilled in the art better understand the embodiments of the present application, rather than for limiting the scope of the present application.

It should be understood that terms used in embodiments of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, composition and steps of the examples have been described generally according to functions in the foregoing description. Whether these functions are performed by hardware or software depends on particular applications and designed constraint conditions of the technical solutions. Persons skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection via some interfaces, apparatuses or units, and may also be connection in electrical, mechanical or other forms.

The units described as separate components may or may not be physically separate, and components displayed as units may or may not be physical units, may be located in one position, or may be distributed on multiple network units. Some or all of the units may be selected according to actual needs to achieve the objectives of solutions of the embodiments of the present application.

In addition, various functional units in various embodiments of the present application may be integrated into a processing unit, or each unit may exist alone physically, or two or more units may be integrated into one unit. The integrated unit may be implemented in a form of hardware, or may be implemented in a form of a software functional unit.

If the integrated unit is implemented in the form of a software functional unit and is sold or used as an independent product, it may be stored in a computer readable storage medium. Based on such understanding, technical solutions of the present application essentially, or the part contributing to the prior art, or some or all of the technical solutions, may be implemented in a form of a software product. The software product is stored in a storage medium and includes several instructions for instructing a computer device (which may be a personal computer, a server, a network device, or the like) to perform some or all of the steps of the methods described in the embodiments of the present application. The foregoing storage medium includes: various media that may store program codes, such as a U-disk, a removable hard disk, a read-only memory (ROM), a random access memory (RAM), a magnetic disk, a compact disk, and so on.

The foregoing descriptions are merely specific embodiments of the present application, but the protection scope of the present application is not limited thereto, persons skilled in the art who are familiar with the technical field could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. An optical fingerprint apparatus, wherein the optical fingerprint apparatus is configured to be disposed under a display screen of an electronic device and comprises:
    a light directing layer configured to direct a light signal returned from a finger above the display screen to an optical sensing array along at least two directions, wherein the at least two directions are oblique with respect to the display screen, and projections of the at least two directions on the display screen are at different angles with a polarization direction of the display screen; and
    the optical sensing array comprising a plurality of sensing unit groups, each sensing unit group comprising at least two optical sensing units, and each optical sensing unit of the at least two optical sensing units being configured to receive a light signal in one direction of the at least two directions, wherein light signals in the at least two directions are used to obtain a fingerprint image of the finger, and a difference between the light signals in the at least two directions received by the sensing unit group is used to determine whether the finger is a real finger.

2. The optical fingerprint apparatus according to claim 1, wherein the at least two directions comprise a first direction and a second direction, a projection of the first direction on the display screen is parallel to the polarization direction of the display screen, and a projection of the second direction on the display screen is perpendicular to the polarization direction of the display screen.

3. The optical fingerprint apparatus according to claim 1, wherein the at least two directions comprise a first direction and a second direction, and projections of the first direction and the second direction on the optical sensing array are respectively parallel to two diagonal lines of an optical sensing unit.

4. The optical fingerprint apparatus according to claim 1, wherein the at least two directions comprise a first direction, a second direction, a third direction, and a fourth direction, and projections of the first direction and the fourth direction on the display screen are parallel to the polarization direction of the display screen, and projections of the second direction and the third direction on the display screen are perpendicular to the polarization direction of the display screen; and
    the sensing unit group comprises four optical sensing units in a 2×2 array that are respectively configured to receive light signals directed by the light directing layer along the first direction, the second direction, the third direction and the fourth direction, wherein a difference between light signals in the first direction and the fourth direction received by the sensing unit group and light signals in the second direction and the third direction received by the sensing unit group is used to determine whether the finger is a real finger.

5. The optical fingerprint apparatus according to claim 4, wherein optical sensing units for receiving the light signals in the first direction and the fourth direction in the sensing unit group are located on a diagonal line of the 2×2 array, and optical sensing units for receiving the light signals in the second direction and the third direction in the sensing unit group are located on another diagonal line of the 2×2 array.

6. The optical fingerprint apparatus according to claim 4, wherein the light signals in the first direction and the fourth direction received by the sensing unit group are light signals dominated by a P wave, and the light signals in the second direction and the third direction received by the sensing unit group are light signals dominated by an S wave.

7. The optical fingerprint apparatus according to claim 1, wherein the light directing layer comprises:
    a micro-lens array comprising a plurality of micro-lenses for converging the light signals in the at least two directions; and
    at least one light shielding layer disposed below the micro-lens array, wherein each light shielding layer comprises multiple groups of holes corresponding to the plurality of micro-lenses, and the plurality of micro-lenses are configured to direct the light signals in the at least two directions to the optical sensing array through corresponding multiple groups of holes in the at least one light shielding layer.

8. The optical fingerprint apparatus according to claim 7, wherein the at least one light shielding layer is a plurality of light shielding layers, a bottom light shielding layer of the plurality of light shielding layers is provided with a hole corresponding to each optical sensing unit in the sensing unit group respectively, and a top light shielding layer of the plurality of light shielding layers is provided with a hole corresponding to each optical sensing unit in the sensing unit group respectively, or is provided with one hole corresponding to the sensing unit group, so that the plurality of micro-lenses converge the light signals in the at least two directions to each optical sensing unit in the optical sensing array through corresponding holes respectively, apertures of holes in the plurality of light shielding layers corresponding to a same optical sensing unit sequentially decrease from top to bottom.

9. The optical fingerprint apparatus according to claim 8, wherein each micro-lens of the plurality of micro-lenses corresponds to one sensing unit group of the plurality of sensing unit groups, and the micro-lens is disposed above a corresponding sensing unit group, wherein a connecting line direction of a group of holes in respective light shielding layers corresponding to a same micro-lens is used to form the at least two directions, and the micro-lens is configured to direct the light signals in the at least two directions to the at least two optical sensing units in the corresponding sensing unit group through a corresponding group of holes in the at least one light shielding layer.

10. The optical fingerprint apparatus according to claim 8, wherein each micro-lens of the plurality of micro-lenses corresponds to one optical sensing unit, and the micro-lens is disposed obliquely above a corresponding sensing unit, wherein a connecting line direction of a group of holes in respective light shielding layers corresponding to a same micro-lens is used to form the one direction of the at least two directions, and the micro-lens is configured to direct the light signal in the one direction to the corresponding optical sensing unit through a corresponding group of holes in the at least one light shielding layer.

11. The optical fingerprint apparatus according to claim 7, wherein the optical fingerprint apparatus further comprises a transparent medium layer, and the transparent medium layer is configured to connect the micro-lens array, the at least one light shielding layer and the optical sensing array.

12. The optical fingerprint apparatus according to claim 1, wherein the light directing layer comprises:
  a plurality of light directing channels disposed obliquely with respect to the display screen, wherein oblique directions of the plurality of light directing channels with respect to the display screen are used to form the at least two directions, and the plurality of light directing channels are configured to direct the light signal returned from the finger above the display screen to the at least two optical sensing units in the each sensing unit group along the at least two directions.

13. The optical fingerprint apparatus according to claim 12, wherein each light directing channel of the plurality of light directing channels corresponds to at least one optical sensing unit, and the light directing channel is configured to direct the light signal returned from the finger above the display screen to a corresponding optical sensing unit along the one direction of the at least two directions.

14. The optical fingerprint apparatus according to claim 1, wherein the light directing layer comprises:
  a plurality of optical fibers disposed obliquely with respect to the display screen, wherein oblique directions of the plurality of optical fibers with respect to the display screen are used to form the at least two directions, and the light signals in the at least two directions are transmitted to corresponding optical sensing units in the plurality of optical fibers based on total reflection, each optical fiber of the plurality of optical fibers corresponds to at least one optical sensing unit, and the optical fiber is configured to direct the light signal returned from the finger above the display screen to a corresponding optical sensing unit along the one direction of the at least two directions.

15. The optical fingerprint apparatus according to claim 1, wherein a difference in at least one of a signal amount, a modulation transfer function (MTF), spatial noise, or a contrast of the light signals in the at least two directions is used to determine whether the finger is a real finger.

16. The optical fingerprint apparatus according to claim 15, wherein the at least two directions comprise a first direction and a second direction, a projection of the first direction on the display screen is parallel to the polarization direction of the display screen, and a projection of the second direction on the display screen is perpendicular to the polarization direction of the display screen; and
  if a difference value between a signal amount of a light signal in the first direction and a signal amount of a light signal in the second direction falls within a first range, it is determined that the finger is a real finger; or
  if a difference value between a signal amount of a light signal in the first direction and a signal amount of a light signal in the second direction does not fall within a first range, it is determined that the finger is a fake finger.

17. The optical fingerprint apparatus according to claim 1, wherein the at least two optical sensing units in the each sensing unit group are disposed adjacent to each other.

18. The optical fingerprint apparatus according to claim 1, wherein the optical fingerprint apparatus further comprises a filter layer disposed in a light path between the display screen and the optical sensing array, and configured to filter out a light signal of a non-target wavelength band and transmit a light signal of a target wavelength band.

19. An electronic device, comprising:
  a display screen; and
  an optical fingerprint apparatus, wherein the optical fingerprint apparatus is configured to be disposed under a display screen of an electronic device and comprises:
  a light directing layer configured to direct a light signal returned from a finger above the display screen to an optical sensing array along at least two directions, wherein the at least two directions are oblique with respect to the display screen, and projections of the at least two directions on the display screen are at different angles with a polarization direction of the display screen; and
  the optical sensing array comprising a plurality of sensing unit groups, each sensing unit group comprising at least two optical sensing units, and each optical sensing unit of the at least two optical sensing units being configured to receive a light signal in one direction of the at least two directions, wherein light signals in the at least two directions are used to obtain a fingerprint image of the finger, and a difference between the light signals in the at least two directions received by the sensing unit group is used to determine whether the finger is a real finger.

20. The electronic device according to claim 19, wherein the display screen is an organic light-emitting diode (OLED) display screen, and the optical fingerprint apparatus employs some of display units of the OLED display screen as an excitation light source for optical fingerprint detection.

* * * * *